US012614378B2

(12) United States Patent
Robert et al.

(10) Patent No.: US 12,614,378 B2
(45) Date of Patent: Apr. 28, 2026

(54) SYSTEMS AND METHODS TO PROCESS ELECTRONIC IMAGES TO DETERMINE HISTOPATHOLOGY QUALITY

(71) Applicant: PAIGE.AI, Inc., New York, NY (US)

(72) Inventors: Eric Robert, Quebec City (CA); George Shaikovski, London (GB); Christopher Kanan, Pittsford, NY (US)

(73) Assignee: Paige.AI, Inc., New York, NY (US)

( * ) Notice: Subject to any disclaimer, the term of this patent is extended or adjusted under 35 U.S.C. 154(b) by 418 days.

(21) Appl. No.: 17/852,884

(22) Filed: Jun. 29, 2022

(65) Prior Publication Data

US 2023/0024468 A1 Jan. 26, 2023

Related U.S. Application Data

(60) Provisional application No. 63/203,513, filed on Jul. 26, 2021.

(51) Int. Cl.
*G06V 10/774* (2022.01)
*G06T 7/00* (2017.01)
*G06V 10/46* (2022.01)

(52) U.S. Cl.
CPC .......... *G06V 10/774* (2022.01); *G06V 10/469* (2022.01)

(58) Field of Classification Search
CPC ................ G06V 10/774; G06V 10/469; G06T 2207/20021; G06T 2207/20081; G06T 2207/20084; G06T 2207/20104; G06T 2207/30024; G06T 2207/30168; G06T 7/0012
See application file for complete search history.

(56) References Cited

U.S. PATENT DOCUMENTS 10,831,417 B1 * 11/2020 Su ............................ G06N 3/09
11,210,787 B1 * 12/2021 Godrich ................. G16H 70/20
(Continued)

FOREIGN PATENT DOCUMENTS

WO 2018156133 A1 8/2018

OTHER PUBLICATIONS

Wahab, Noorul, et al. "Semantic annotation for computational pathology: Multidisciplinary experience and best practice recommendations", Arxiv.org, Cornell University Library, 201 Olin Library Cornell University Ithaca, NY 14853, Jun. 25, 2021 (Jun. 25, 2021), XP081997376.

(Continued)

*Primary Examiner* — Stephen R Koziol
*Assistant Examiner* — Joshua Chen
(74) *Attorney, Agent, or Firm* — Bookoff McAndrews, PLLC

(57) ABSTRACT

A computer-implemented method for processing an electronic image may include receiving, by an artificial intelligence (AI) system at an electronic storage of the AI system, one or more digital whole slide images (WSIs) and extracting one or more vectors of features from one or more foreground tiles of tile images of the one or more digital WSIs. The method may include running a trained machine learning model on the one or more vectors of features and determining, based on an output of the trained machine learning model, whether one or more quality issues are present in the one or more digital WSIs.

20 Claims, 13 Drawing Sheets

(56) References Cited

U.S. PATENT DOCUMENTS

| | | | | |
|---|---|---|---|---|
| 11,562,585 B2 * | 1/2023 | Courtiol | .............. | G06V 10/764 |
| 12,014,830 B2 * | 6/2024 | LeBoeuf | ................ | G06V 20/70 |
| 2018/0114317 A1 * | 4/2018 | Song | ....................... | G06F 18/21 |
| 2020/0184673 A1 * | 6/2020 | Hsieh | ...................... | G06T 7/136 |
| 2023/0289955 A1 * | 9/2023 | Xie | ....................... | G06T 7/0012 |
| 2024/0079116 A1 * | 3/2024 | Miri | ....................... | G16H 30/40 |

OTHER PUBLICATIONS

Mario Plebani, "Quality Indicators to Detect Pre-Analytical Errors in Laboratory Testing," Clin. Biochem Rev. vol. 33, 2012, available at: https://www.ncbi.nlm.nih.gov/pmc/articles/PMC3428256/pdf/cbr_33_3_85.pdf.
Riana Lee Yeates, An Investigation in Pre-Analytical Error in a Medium Sized Pathology Laboratory: Frequency, Origin, Type, and a Proposed Intervention, ResearchOnline@JCU, 2016, available at: https://researchonline.jcu.edu.au/49872/1/49872-yeates-2016-thesis.pdf.
Department of Health, "Review of the Review of NHS Pathology Services in England," 2006, available at: https://www.networks.nhs.uk/nhs-networks/peninsula-pathology-network/documents/CarterReviewPathologyReport.pdf.

* cited by examiner

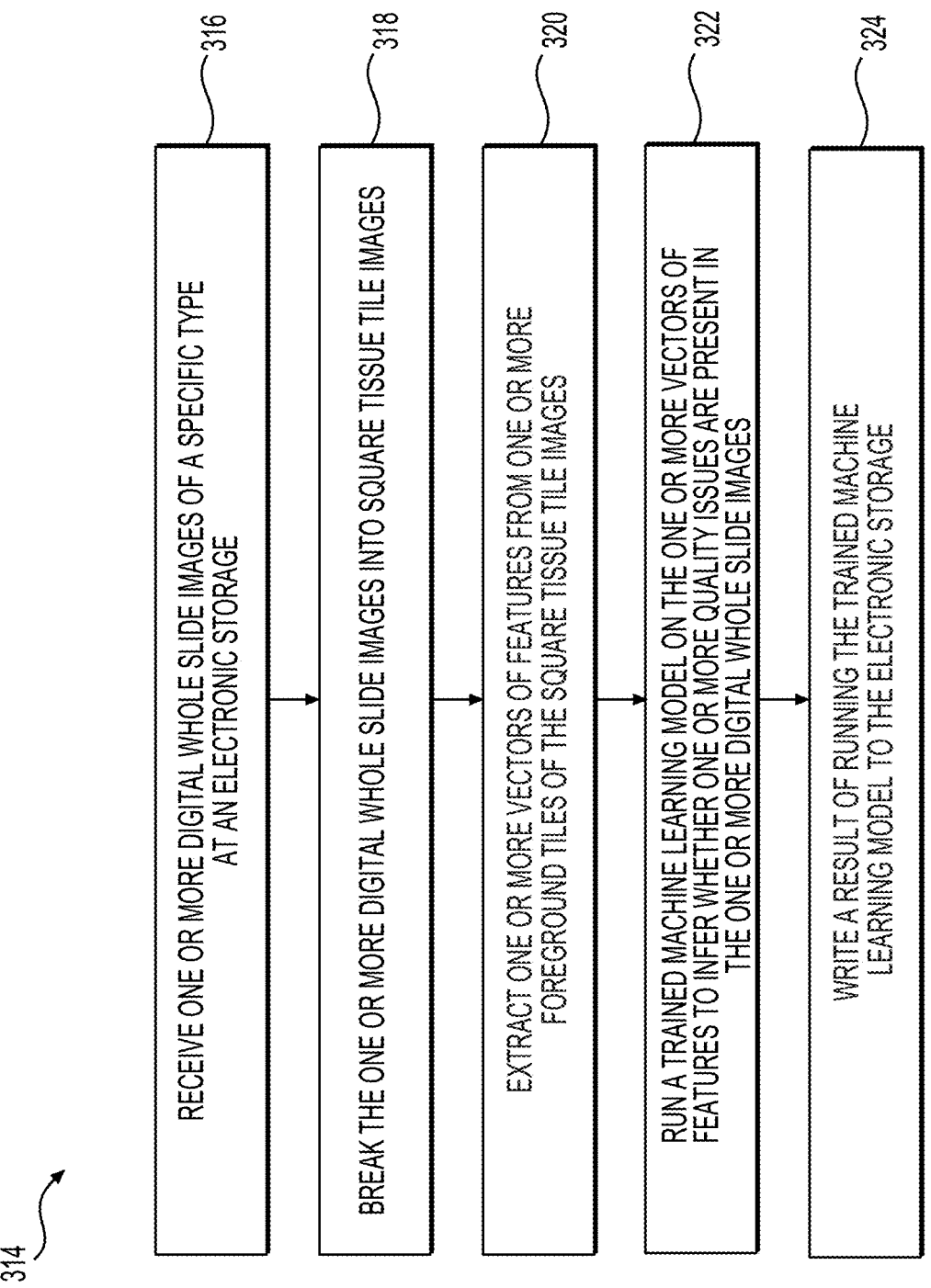

316 — RECEIVE ONE OR MORE DIGITAL WHOLE SLIDE IMAGES OF A SPECIFIC TYPE AT AN ELECTRONIC STORAGE

318 — BREAK THE ONE OR MORE DIGITAL WHOLE SLIDE IMAGES INTO SQUARE TISSUE TILE IMAGES

320 — EXTRACT ONE OR MORE VECTORS OF FEATURES FROM ONE OR MORE FOREGROUND TILES OF THE SQUARE TISSUE TILE IMAGES

322 — RUN A TRAINED MACHINE LEARNING MODEL ON THE ONE OR MORE VECTORS OF FEATURES TO INFER WHETHER ONE OR MORE QUALITY ISSUES ARE PRESENT IN THE ONE OR MORE DIGITAL WHOLE SLIDE IMAGES

324 — WRITE A RESULT OF RUNNING THE TRAINED MACHINE LEARNING MODEL TO THE ELECTRONIC STORAGE

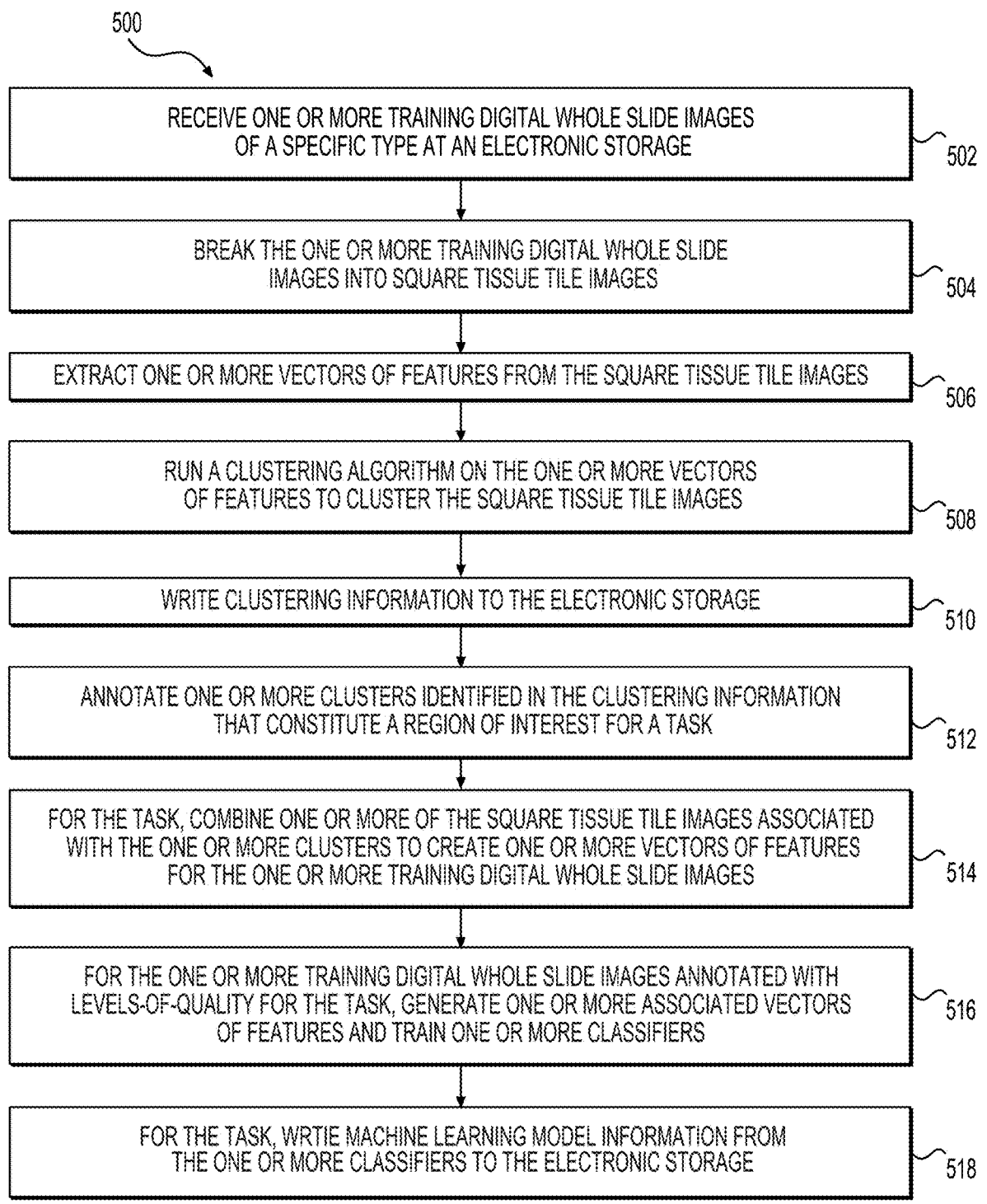

500

RECEIVE ONE OR MORE TRAINING DIGITAL WHOLE SLIDE IMAGES
OF A SPECIFIC TYPE AT AN ELECTRONIC STORAGE ⟶ 502

BREAK THE ONE OR MORE TRAINING DIGITAL WHOLE SLIDE
IMAGES INTO SQUARE TISSUE TILE IMAGES ⟶ 504

EXTRACT ONE OR MORE VECTORS OF FEATURES FROM THE SQUARE TISSUE TILE IMAGES ⟶ 506

RUN A CLUSTERING ALGORITHM ON THE ONE OR MORE VECTORS
OF FEATURES TO CLUSTER THE SQUARE TISSUE TILE IMAGES ⟶ 508

WRITE CLUSTERING INFORMATION TO THE ELECTRONIC STORAGE ⟶ 510

ANNOTATE ONE OR MORE CLUSTERS IDENTIFIED IN THE CLUSTERING INFORMATION
THAT CONSTITUTE A REGION OF INTEREST FOR A TASK ⟶ 512

FOR THE TASK, COMBINE ONE OR MORE OF THE SQUARE TISSUE TILE IMAGES ASSOCIATED
WITH THE ONE OR MORE CLUSTERS TO CREATE ONE OR MORE VECTORS OF FEATURES
FOR THE ONE OR MORE TRAINING DIGITAL WHOLE SLIDE IMAGES ⟶ 514

FOR THE ONE OR MORE TRAINING DIGITAL WHOLE SLIDE IMAGES ANNOTATED WITH
LEVELS-OF-QUALITY FOR THE TASK, GENERATE ONE OR MORE ASSOCIATED VECTORS
OF FEATURES AND TRAIN ONE OR MORE CLASSIFIERS ⟶ 516

FOR THE TASK, WRTIE MACHINE LEARNING MODEL INFORMATION FROM
THE ONE OR MORE CLASSIFIERS TO THE ELECTRONIC STORAGE ⟶ 518

*FIG. 5A*

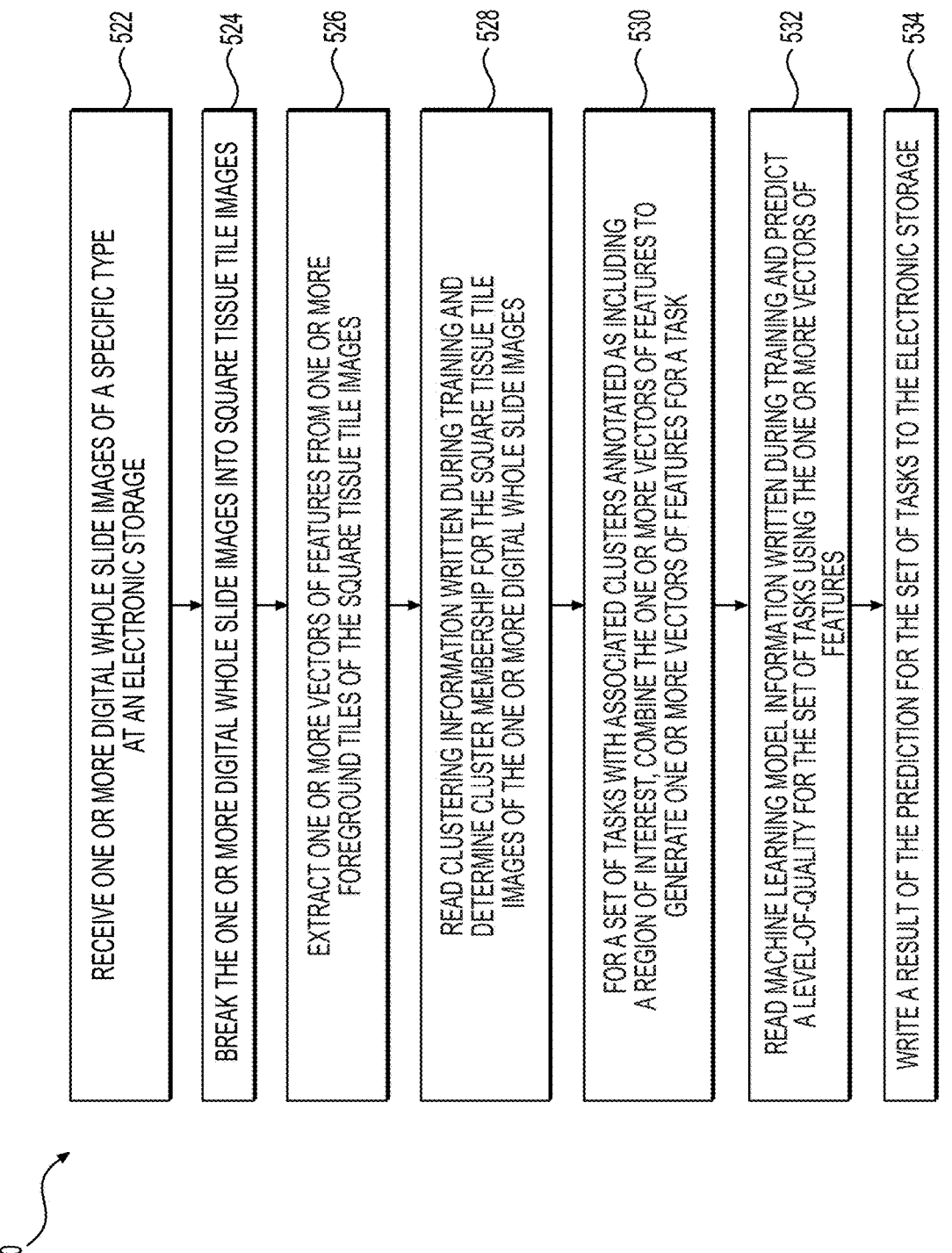

522 — RECEIVE ONE OR MORE DIGITAL WHOLE SLIDE IMAGES OF A SPECIFIC TYPE AT AN ELECTRONIC STORAGE

524 — BREAK THE ONE OR MORE DIGITAL WHOLE SLIDE IMAGES INTO SQUARE TISSUE TILE IMAGES

526 — EXTRACT ONE OR MORE VECTORS OF FEATURES FROM ONE OR MORE FOREGROUND TILES OF THE SQUARE TISSUE TILE IMAGES

528 — READ CLUSTERING INFORMATION WRITTEN DURING TRAINING AND DETERMINE CLUSTER MEMBERSHIP FOR THE SQUARE TISSUE TILE IMAGES OF THE ONE OR MORE DIGITAL WHOLE SLIDE IMAGES

530 — FOR A SET OF TASKS WITH ASSOCIATED CLUSTERS ANNOTATED AS INCLUDING A REGION OF INTEREST, COMBINE THE ONE OR MORE VECTORS OF FEATURES TO GENERATE ONE OR MORE VECTORS OF FEATURES FOR A TASK

532 — READ MACHINE LEARNING MODEL INFORMATION WRITTEN DURING TRAINING AND PREDICT A LEVEL-OF-QUALITY FOR THE SET OF TASKS USING THE ONE OR MORE VECTORS OF FEATURES

534 — WRITE A RESULT OF THE PREDICTION FOR THE SET OF TASKS TO THE ELECTRONIC STORAGE

SYSTEMS AND METHODS TO PROCESS ELECTRONIC IMAGES TO DETERMINE HISTOPATHOLOGY QUALITY

RELATED APPLICATION(S)

This application claims priority to U.S. Provisional Application No. 63/203,513 filed on Jul. 26, 2021, the entire disclosure of which is hereby incorporated herein by reference in its entirety.

FIELD OF THE DISCLOSURE

Various embodiments of the present disclosure pertain generally to image processing methods. More specifically, particular embodiments of the present disclosure relate to systems and methods for determining the location, presence and kind of relevant quality control issues in digital pathology imagery.

BACKGROUND

Quality of pathology slides is critically important to their correct interpretation by human pathologists or by artificial intelligence (AI) systems operating on them. However, a need exists for automated systems to report why a slide is of insufficient quality or rejected, and this rejection threshold may need to be adjusted for an algorithm operating on the images depending on a specific application.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the present disclosure, systems and methods are disclosed for determining quality issues present in a digital whole slide image.

A computer-implemented method for processing an electronic image may include receiving, by an artificial intelligence (AI) system at an electronic storage of the AI system, one or more digital whole slide images (WSIs) and extracting one or more vectors of features from one or more foreground tiles of tile images of the one or more digital WSIs. The method may include running a trained machine learning model on the one or more vectors of features and determining, based on an output of the trained machine learning model, whether one or more quality issues are present in the one or more digital WSIs.

A computer system for processing an electronic image may include at least one memory storing instructions and at least one processor configured to execute the instructions to perform operations. The operations may include receiving, by an artificial intelligence (AI) system at an electronic storage of the AI system, one or more digital whole slide images (WSIs) and extracting one or more vectors of features from one or more foreground tiles of tile images of the one or more digital WSIs. The operations may include running a trained machine learning model on the one or more vectors of features and determining, based on an output of the trained machine learning model, whether one or more quality issues are present in the one or more digital WSIs.

A non-transitory computer-readable medium may store instructions that, when executed by a processor, cause the processor to perform operations for processing an electronic image. The operations may include receiving, by an artificial intelligence (AI) system at an electronic storage of the AI system, one or more digital whole slide images (WSIs) and extracting one or more vectors of features from one or more foreground tiles of tile images of the one or more digital WSIs. The operations may include running a trained machine learning model on the one or more vectors of features and determining, based on an output of the trained machine learning model, whether one or more quality issues are present in the one or more digital WSIs.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3B is a flow chart of an exemplary method for using an algorithm with expert labeling, according to an exemplary embodiment of the present disclosure, according to an exemplary embodiment of the present disclosure.

FIG. 5A is a flowchart of an exemplary method for training an algorithm using clustering analysis to identify regions of interest, according to an exemplary embodiment of the present disclosure.

FIG. 5B is a flowchart of an exemplary method for using an algorithm with clustering analysis to identify regions of interest, according to an exemplary embodiment of the present disclosure, according to an exemplary embodiment of the present disclosure.

DESCRIPTION OF THE EMBODIMENTS

Figure 1A:
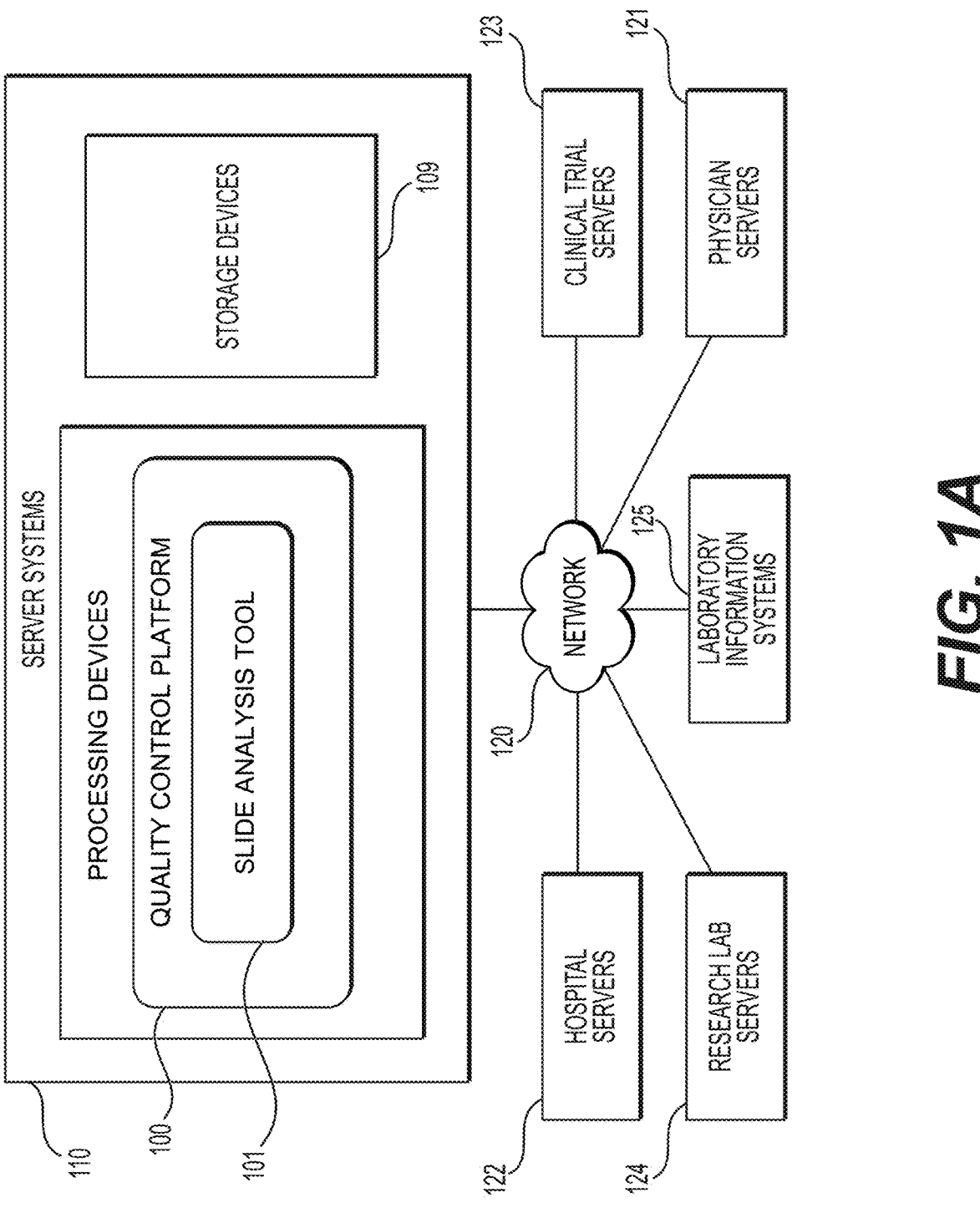
FIG. 1A illustrates an exemplary block diagram of a system and network for processing electronic images to determine histopathology quality, according to an exemplary embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts.

The systems, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these devices, systems, or methods unless specifically designated as mandatory.

Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

As used herein, the term "exemplary" is used in the sense of "example," rather than "ideal." Moreover, the terms "a" and "an" herein do not denote a limitation of quantity, but rather denote the presence of one or more of the referenced items.

Pathology testing is a vital part of the health system, with clinicians relying on a pathology test to make up to 70% of their treatment decisions. There may be many opportunities for error to occur during the collection process that may affect results issued to the clinician. While it may be unclear which measurement quality issues lead to medical errors, quality issues may add significant delays in diagnosis by the pathologist that could negatively impact patient outcome.

Errors associated with pre-analytical quality control in histopathology laboratories have been identified to be as high as 5%. Although there is no consensus on what constitutes reportable pre-analytical errors, studies may only capture errors that were recorded and led to an erroneous result. Therefore, the recorded error rate may be lower than the actual rate of errors in laboratories due to pre-analytical errors that did not change the results significantly enough to be detected.

Techniques presented herein relate to detecting artifacts and to classifying each region of a slide based on the kind of tissue present within each local region of the slide. In addition, techniques presented herein describe inferring quality issues regarding a portion of, or all of a slide, using artificial intelligence (AI) and/or computer vision algorithms. Certain embodiments may report problems with a slide and may indicate specifically where in the image the problem is found.

FIG. 1A illustrates a block diagram of a system and network for processing electronic images to determine histopathology quality, according to an exemplary embodiment of the present disclosure. Specifically, FIG. 1A illustrates server systems 110 that include various processing devices (e.g., a quality control platform 100 that includes a slide analysis tool 101) and storage devices 109, a network 120, physician servers 121, hospital servers 122, clinical trial servers 123, research lab servers 124, and laboratory information systems 125.

The server systems 110 may include one or more interconnected systems of server devices (e.g., multiple interconnected datacenters or cloud networks, multiple interconnected systems within a datacenter or a cloud network, etc.). Server systems 110 may include one or more storage devices 109 (e.g., digital and/or electronic storage devices 109) for storing images and data received from at least one of the physician servers 121, the hospital servers 122, the clinical trial servers 123, the research lab servers 124, and/or the laboratory information systems 125. The server systems 110 may also include processing devices for processing images and data stored in the one or more storage devices 109. For example, the server systems 110 may include processing devices that are configured to implement the quality control platform 100. The quality control platform 100 may use the slide analysis tool 101 to analyze tissues in a whole slide image (WSI).

The server systems 110 may further include one or more machine learning tool(s) or capabilities. For example, the processing devices may include a machine learning tool for the quality control platform 100 (e.g., the processing devices may run one or more trained machine learning models). In certain embodiments, a portion or all of the operations performed by the processing devices may be performed on a local processing device (e.g., a desktop computer, a laptop computer, a mobile phone, a tablet, etc.).

The network 120 may include one or more wired and/or wireless networks, such as the Internet, an intra-net, a cellular network (e.g., a Third Generation Partnership Project (3GPP) 3G network, 4G network 5G network, etc.), a wide area network (WAN), a local area network (LAN), a public land mobile network (PLMN), and/or the like. The network 120 may be connected to servers, e.g., at hospitals, laboratories, doctors' offices, etc. For example, the physician servers 121, the hospital servers 122, the clinical trial servers 123, the research lab servers 124, and/or the laboratory information systems 125, etc., may each be connected to the network 120, such as the Internet, through one or more computers, servers, and/or handheld mobile devices. According to an example embodiment of the present disclosure, the network 120 may also be connected to the server systems 110.

The physician servers 121, the hospital servers 122, the clinical trial servers 123, the research lab servers 124, and/or the laboratory information systems 125 may include one or more server devices (e.g., in a datacenter or distributed in a cloud network). The physician servers 121, the hospital servers 122, the clinical trial servers 123, the research lab servers 124, and/or the laboratory information systems 125 may create or otherwise obtain images of one or more patients' cytology specimen(s), histopathology specimen(s), slide(s) of the specimen(s), digitized images of the slide(s) of the specimen(s), or any combination thereof. The physician servers 121, the hospital servers 122, the clinical trial servers 123, the research lab servers 124, and/or the laboratory information systems 125 may also obtain any combination of patient-specific information, such as age, medical history, cancer treatment history, family history, past biopsy or cytology information, etc. The physician servers 121, the hospital servers 122, the clinical trial servers 123, the research lab servers 124, and/or the laboratory information systems 125 may transmit digitized slide images and/or patient-specific information to the server systems 110 over the network 120.

The physician servers 121, the hospital servers 122, the clinical trial servers 123, the research lab servers 124, and/or the laboratory information systems 125 may provide images of slides for review by a pathologist. In hospital settings, tissue type information may be stored in the laboratory information systems 125. In certain embodiments, electronic images may be processed to determine histopathology quality without needing to access the laboratory information systems 125. Additionally, access to content stored by the laboratory information systems 125 may be limited due to its sensitive nature.

Figure 1B:
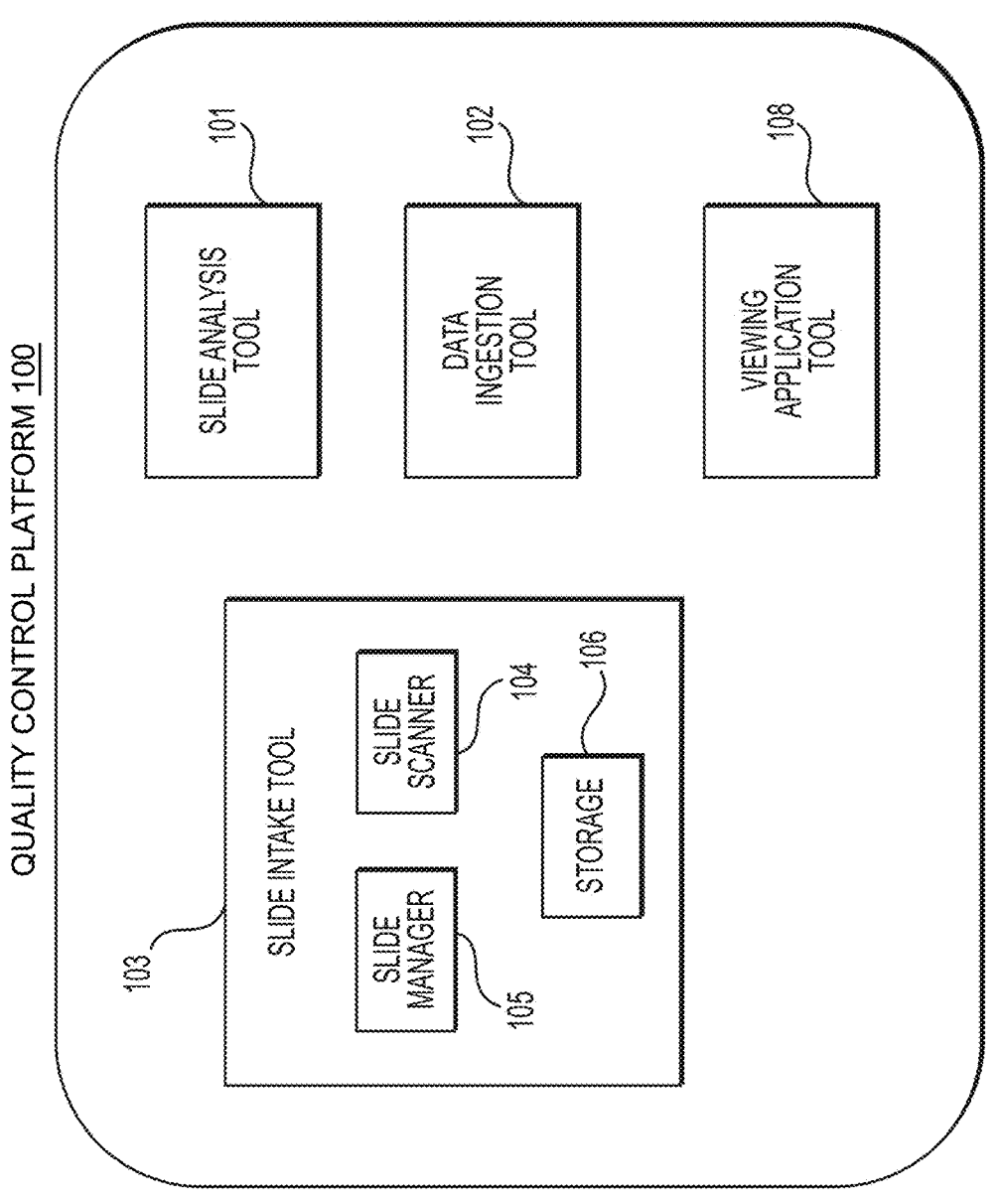
FIG. 1B illustrates an exemplary block diagram of the quality control platform of the system of FIG. 1A, according to an exemplary embodiment of the present disclosure.

FIG. 1B illustrates an exemplary block diagram of the quality control platform 100 of the system of FIG. 1A, according to certain embodiments of the present disclosure. As illustrated in FIG. 1B, the quality control platform 100 may include the slide analysis tool 101, a data ingestion tool 102, a slide intake tool 103 (which may include a slide scanner 104, a slide manager 105, and a storage 106), and a viewing application tool 108. The slide analysis tool 101 may include one or more computing devices capable of, e.g., processing electronic images to determine histopathology quality. For example, the slide analysis tool 101 may transmit and/or receive digitized slide images and/or patient information to the server systems 110, the physician servers 121, the hospital servers 122, the clinical trial servers 123, the research lab servers 124, and/or the laboratory information systems 125 over the network 120.

The data ingestion tool 102 may include one or more computing devices capable of, e.g., facilitating a transfer of the digital pathology images to various tools, modules, components, and devices described herein that are used for classifying and processing the digital pathology images. The slide intake tool 103 may include one or more computing devices capable of, e.g., scanning pathology images and converting them into a digital form. For example, the slides may be scanned with the slide scanner 104, and the slide manager 105 may process the images on the slides into digitized pathology images and store the digitized images in the storage 106 (e.g., a digital or electronic storage device). The viewing application tool 108 may include one or more computing devices capable of, e.g., providing a user (e.g., a pathologist) with specimen property or image property information pertaining to digital pathology image(s). The information may be provided through various output interfaces (e.g., a screen, a monitor, a storage device, a web browser, etc.).

The server systems 110 (not illustrated in FIG. 1B) may store images and data received from the slide analysis tool 101, the data ingestion tool 102, the slide intake tool 103, the slide scanner 104, the slide manager 105, and/or the viewing application tool 108 (e.g., may store this information in the storage devices 109). The server systems 110 may process the images and data using the processing devices. The server systems 110 may further use one or more machine learning tool(s) or capabilities to process the images and data.

Figure 1C:
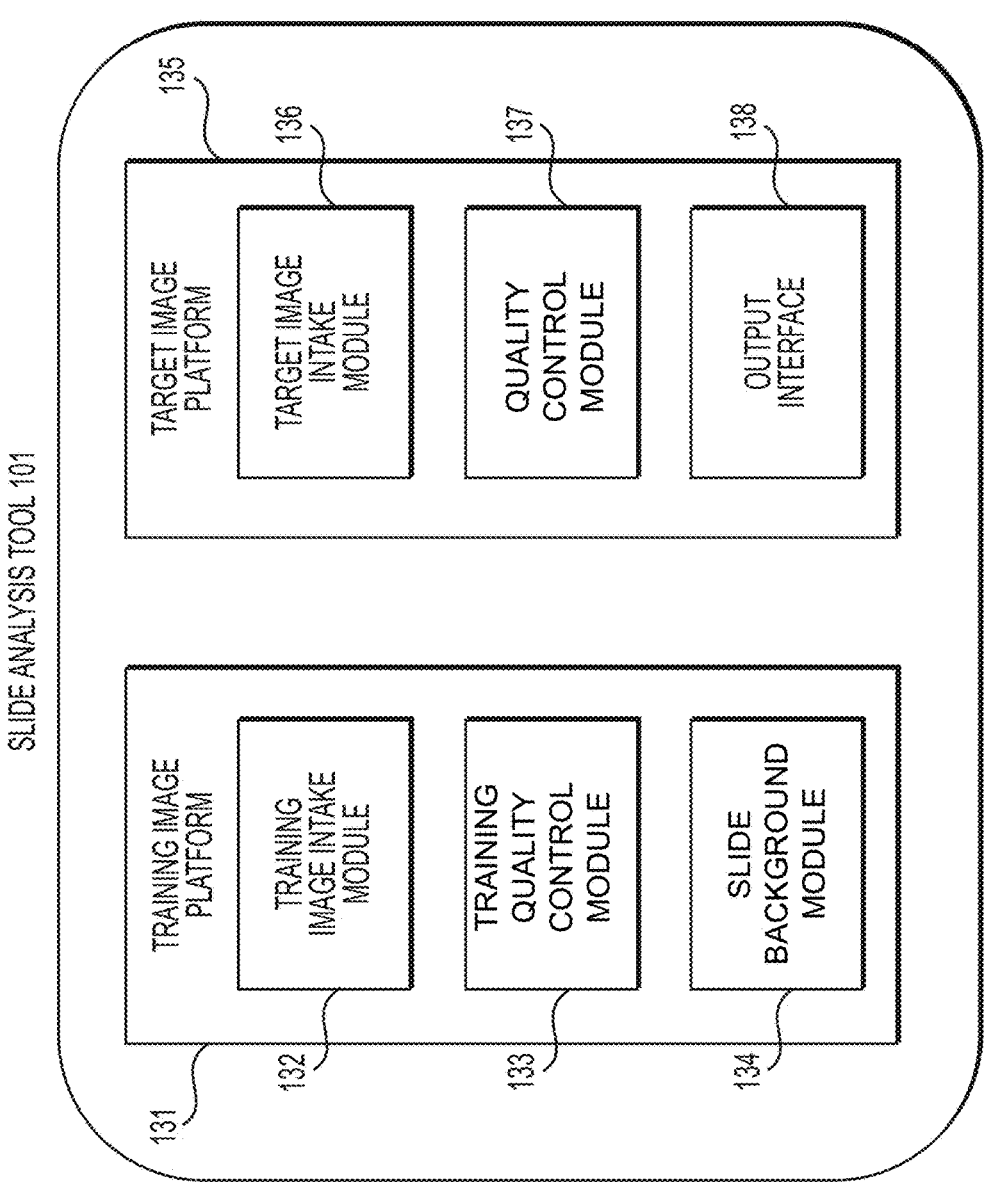
FIG. 1C illustrates an exemplary block diagram of the slide analysis tool of the system of FIG. 1A, according to an exemplary embodiment of the present disclosure.

FIG. 1C illustrates an exemplary block diagram of the slide analysis tool 101 of the system of FIG. 1A, according to certain embodiments of the present disclosure. The slide analysis tool 101 may include a training image platform 131 (e.g., that may include a training image intake module 132, a training quality control module 133, and a slide background module 134) and/or a target image platform 135 (e.g., that may include a target image intake module 136, a quality control module 137, and an output interface 138).

The training image platform 131 may include one or more computing devices capable of, e.g., creating or receiving training images that are used to train a machine learning model to effectively analyze and classify digital pathology images. For example, the training images may be received from the server systems 110, the physician servers 121, the hospital servers 122, the clinical trial servers 123, the research lab servers 124, and/or the laboratory information systems 125. Images used for training may be obtained from real sources (e.g., humans, animals, etc.) or may come from synthetic sources (e.g., graphics rendering engines, three dimensional (3D) models, etc.). Examples of digital pathology images may include (a) digitized slides stained with a variety of stains, such as H&E, Hematoxylin alone, immunohistochemistry (IHC), molecular pathology, etc.; and/or (b) digitized tissue samples from a 3D imaging device, such as microcomputed tomography (microCT).

The training image intake module 132 may include one or more computing devices capable of, e.g., creating, receiving, or analyzing a dataset comprising one or more training datasets corresponding to one or more health variables and/or one or more data variables. For example, the training datasets may be received from the server systems 110, the physician servers 121, the hospital servers 122, the clinical trial servers 123, the research lab servers 124, and/or the laboratory information systems 125. This dataset may be kept on a digital and/or electronic storage device. The training quality control module 133 may include one or more computing devices capable of, e.g., determining whether the training images have a sufficient level-of-quality for training a machine learning model. The slide background module 134 may include one or more computing devices capable of, e.g., identifying whether a set of individual cells belong to a cell of interest or a background of a digitized image. Upon identification of background portions of a training image, the slide background module 134.

The target image platform 135 may include one or more computing devices capable of, e.g., receiving a target image and applying a machine learning model to the received target image to determine a characteristic of a target data set. For example, the target data may be received from the server systems 110, the physician servers 121, the hospital servers 122, the clinical trial servers 123, the research lab servers 124, and/or the laboratory information systems 125. The target image intake module 136 may include one or more computing devices capable of, e.g., receiving a target dataset corresponding to a target health variable or a data variable. Quality control module 137 may include one or more computing devices capable of, e.g., applying a machine learning model to the target dataset to determine a characteristic of the target health variable or a data variable and whether the target dataset has a sufficient quality for processing by a machine learning model. The quality control module 137 may also apply the machine learning model to the target dataset to determine a quality score for the target dataset. Further, the quality control module 137 may apply the machine learning model to the target images to determine whether a target element is present in a determined relationship.

The output interface 138 may include one or more computing devices capable of, e.g., outputting information about the target data and the determined relationship (e.g., to a screen, monitor, storage device, web browser, etc.).

Any of the above devices, tools, and modules may be located on a device that may be connected to an electronic network 120, such as the Internet or a cloud service provider, through one or more computers, servers, and/or handheld mobile devices.

Figures 2A, 2B, 2C:
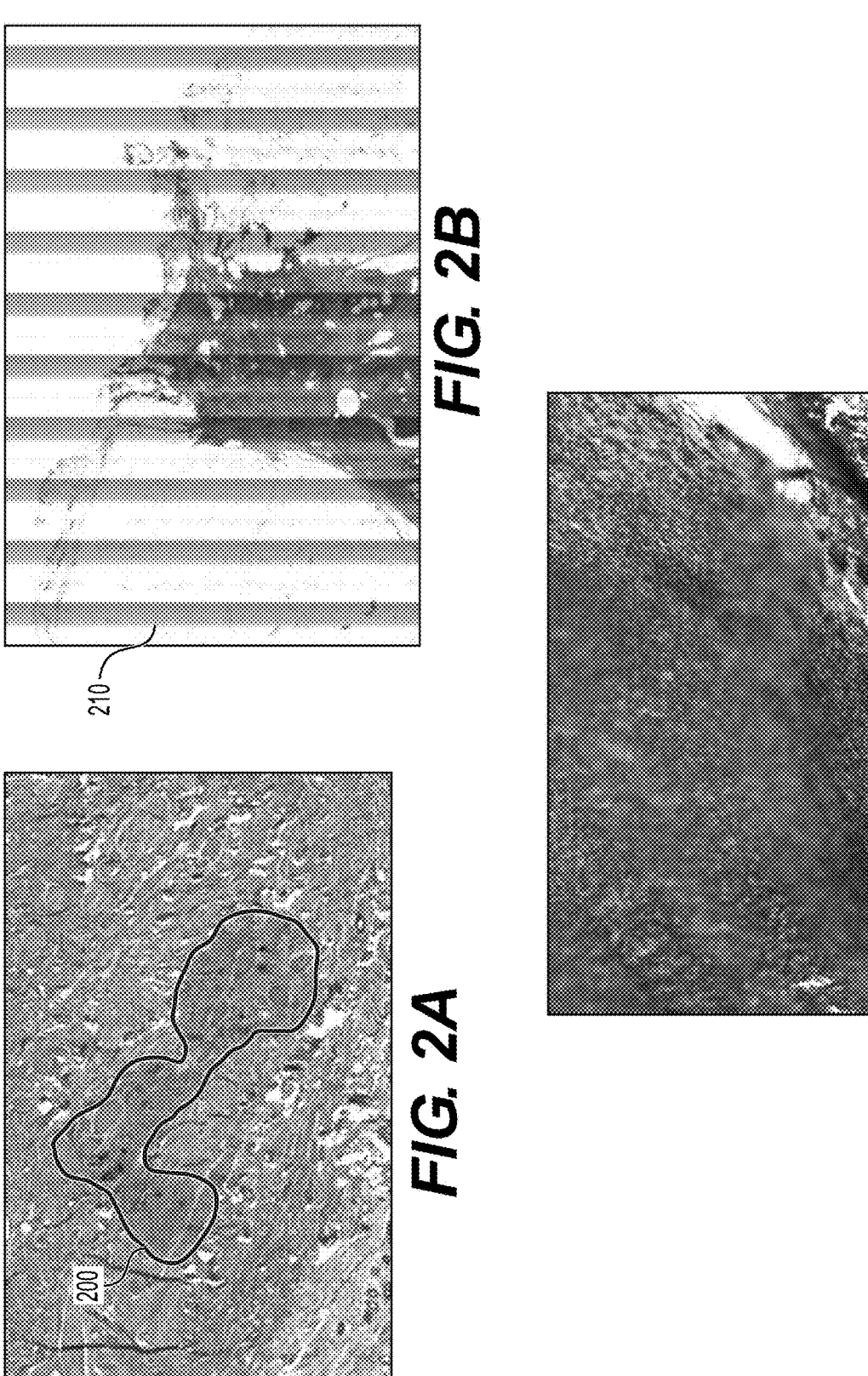
FIGS. 2A-2C show exemplary quality control (QC) issues in a whole slide image, according to an exemplary embodiment of the present disclosure.

FIGS. 2A-2C show exemplary QC issues in a whole slide image, according to an exemplary embodiment of the present disclosure. FIG. 2A illustrates an exemplary QC problem that may be caused by a bubble 200 present in the slide. FIG. 2B illustrates an exemplary QC problem that may be caused by a series of scan lines 210. FIG. 2C illustrates exemplary QC problems that may be due to multiple issues, including blur, over-staining, and crushed tissue.

Pathology slides and their digital images may suffer from a diverse set of issues that can interfere with human or algorithmic analysis, as shown in FIGS. 2A-2C. This analysis includes, but is not limited to, diagnosis, tumor segmentation, archiving, genomic testing, and training machine learning systems on these images. To mitigate this problem, one possible workflow technique may employ simple on-device algorithms for detecting blur, which often fail, and manual review by human technicians. However, these solutions are limited as there are many problems beyond blur that may complicate downstream analysis. Moreover, blur is heterogeneous and may not be located everywhere in a digital image. For example, blur may occur in locations that are irrelevant to subsequent analysis, or the blur may not be severe enough to interfere with the analysis. Rejecting a slide or a slide image due to blur, or other QC issues, may be costly in both time and money. If a slide is rejected due to being poorly prepared, it may mean that more time is needed before that slide can be analyzed by a pathologist or an AI system. In order to save time within a workflow, it may be beneficial to reject slides only if quality factors are predicted to interfere with downstream analysis.

A second problem with QC techniques is that they may not report all of the reasons why a slide could be rejected, which may make it difficult for a technician to identify the problem and rescan the slide. For example, it may be difficult to identify whether the slide was stained or cut improperly.

Some issues generally associated with pre-analytical quality control include administrative issues (e.g., identification, tracking, or medical forms), issues related to the glass slide production (e.g., tissue mounting, staining, floaters, folds, thick cuts, bubbles, scratches, or dirt), digitization issues (e.g., focus, small samples, white balance, or scanning artifacts) or issues stemming directly from the tissue itself (e.g., insufficient, preservation, or crushing). In some situations, glass slides may show other artifacts (e.g., pen marks). While possible issues are numerous, their relative importance is difficult to quantify. For example, a blurred section of slide containing fat tissue may be unlikely to be significant for clinical cancer diagnosis. Similarly, a slide containing a large biopsy site may likely have little effect on clinical diagnosis but may impair the ability to get correct outputs of molecular tests.

When an issue is raised, typically a remediation process exists to implement possible corrective measures (e.g., re-scan, re-mount, re-cut, or re-stain). Because of the turnaround time required to do those corrections, production pipelines may implement a pre-analytic quality control stage to maximize the likelihood that a sample will not be rejected once it reaches the pathologist for analysis. As pathology uses beyond clinical diagnosis keep increasing, it may be suboptimal to determine a unique set of pre-analytical quality control parameters. Depending on the task for which the glass slide was produced, some constraints may be relaxed while keeping the sample usable for a specific planned task. This may reduce costs and turnaround times, and may avoid unnecessary application of remediation processes to sufficiently good samples.

The present disclosure may use an AI system to infer both quality issues regarding an entire slide, and local quality issues that may impact the ability of a pathologist or AI system to use the slide. The AI system may also report the particular problem with the slide, and this reporting may be performed in a spatial manner to indicate specifically where in the image the problem may be found. The present disclosure describes methods to report why a slide is rejected, and may indicate the location(s) in a slide that resulted in that rejection. Reporting in this manner may save pathology labs both time and money, and may make the AI systems safer if they are run automatically in the background, possibly without human review.

Techniques presented herein may use computer vision and/or machine learning to detect artifacts and may classify each region of the slide based on the kind of tissue present within each local region of the slide. There may be two methods of using and training machine learning systems to detect and classify digital slide images. Various embodiments of the present disclosure are possible. A first example embodiment may use human expert annotations of slides and may rank their relevance by running an AI system on the image to determine if quality issues are likely to interfere with performance. A second example embodiment may use a clustering-based method that may provide a signature that infers the usability of a slide.

System Using Expert Labeling for Training

The below description describes how to train an algorithm with human expert slide annotations, according to the first example embodiment described above. Quality issues may be ranked by relevance by running an AI algorithm on the image to determine if these quality issues are likely interfere with performance.

This embodiment may use slides that have been labeled by human annotators to indicate each quality issue on a slide. The presence of a quality issue may be specified by identifying specific locations within a slide, e.g., tiles. Alternatively, an embodiment of the present disclosure may also be trained using weak-labeling based on slide-level annotations for the presence or absence of salient quality issues. Weak labeling may require less work by humans, but may need certain data for accurate training. Conversely, strong labeling may need more work by human annotators, but may need less data.

Figure 3A:
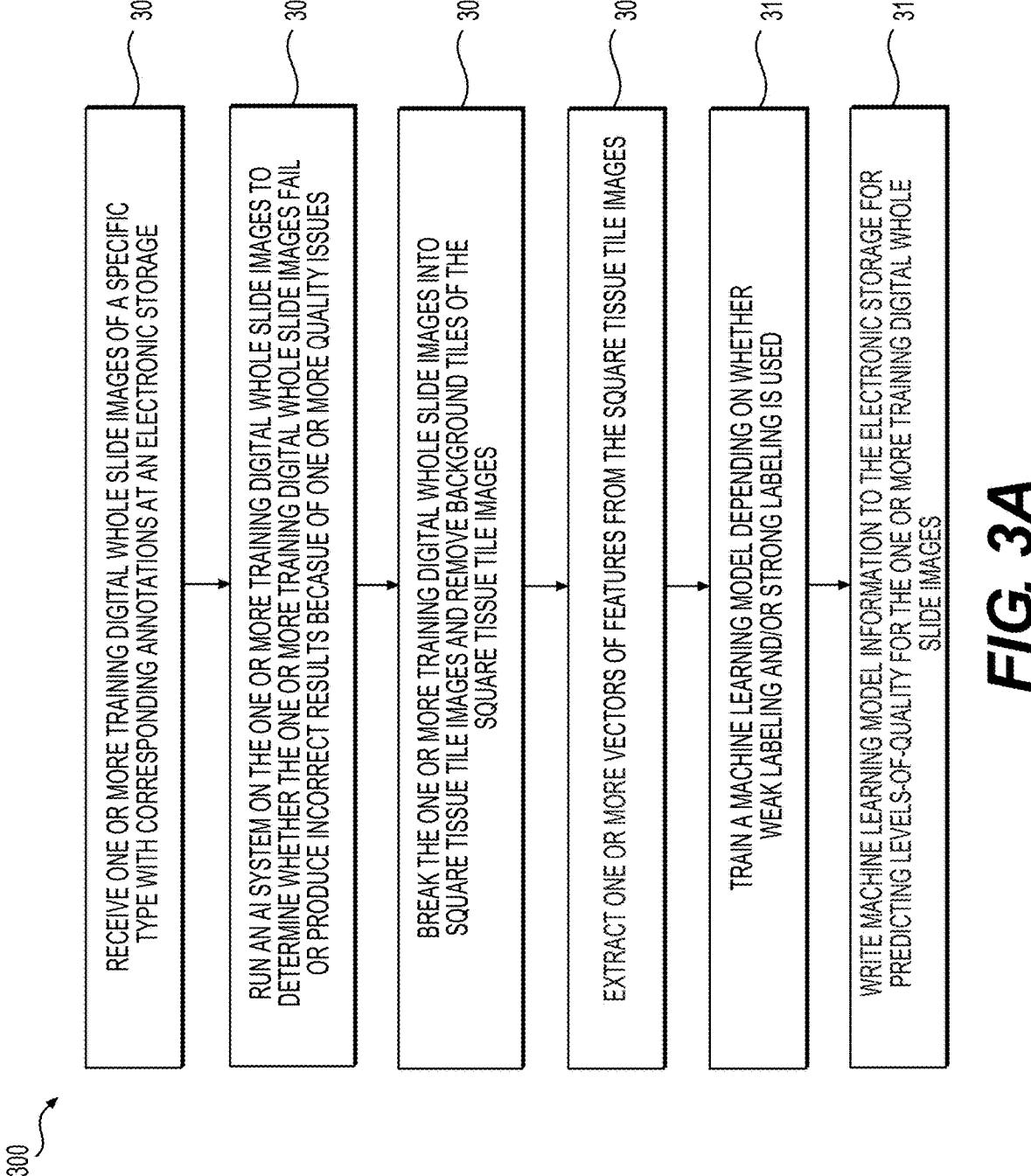
FIG. 3A is a flowchart of an exemplary method for training an algorithm using expert labeling, according to an exemplary embodiment of the present disclosure.

FIG. 3A is a flowchart of an exemplary method 300 for training an algorithm using expert labeling and FIG. 3B is a flowchart of an exemplary method 314 for using an algorithm with expert labeling, according to an exemplary embodiment of the present disclosure. For example, the method 300 (e.g., steps 302-312) and the method 314 (e.g., steps 316-324) may be performed by the slide analysis tool 101 automatically or in response to a request from a user (e.g., physician, pathologist, etc.).

According to one embodiment, the exemplary method 300 for training an algorithm using expert labeling may include one or more of the following steps. In step 302, the method 300 may include receiving one or more training digital whole slide images of a specific type (e.g., kind of tissue, stain used for histology, or whether a slide is a cytology slide) with corresponding annotations at an electronic storage (e.g., hard drive, network drive, cloud storage, random access memory (RAM), etc.). The annotations may include information about one or more quality issues present in the one or more training digital whole slide images. Annotations may be for each location on a slide, and may indicate quality control problems at the locations (strong labeling) or may indicate identified quality issues with a slide, if any (weak labeling). In some embodiments, the one or more training digital whole slide images and the annotations may be received in separate receiving steps or may be received in the same receiving step.

In step 304, the method 300 may include running an AI system on the one or more training digital whole slide images to determine whether the one or more training digital whole slide images fail or produce incorrect results because of one or more quality issues. If the slides are robust regardless of a quality issue being present, the AI system may be trained to determine that the quality issue is an irrelevant issue rather than a relevant issue. For example, minor blur may not cause incorrect performance, or the blur may be located in a region of the image that is not diagnostically important for a task. If the slides are not robust due to a quality issue, the AI system may be trained to output information indicating that the quality issue is likely to prevent the slides use in an analysis.

In step 306, the method 300 may include breaking the one or more training digital whole slide images into square tissue tile images and remove background tiles of the one or more square tissue tile images. The background tiles may be removed using thresholding based on a variance of pixels in a tile to identify if the tiles are foreground, for example, using Otsu's method, comparing a tile pixel value to a reference foreground distribution, etc. In some embodiments, the AI system may receive a selection of the foreground tiles or background tiles. Although certain embodiments include using "square" tissue tile images, certain embodiments described herein may use tiles of any shape.

In step 308, the method 300 may include extracting one or more vectors of features from the square tissue tile images. This may be performed using one or more techniques including, e.g., hand-engineered features (e.g., scale-invariant feature transform (SIFT), oriented fast and rotated brief (ORB), radiation-invariant feature transform (RIFT), speed-up robust features (SURF), etc. descriptors), pre-trained convolutional neural network (CNN) embeddings using supervised learning, pre-trained CNN embeddings using weakly-supervised or self-supervised learning techniques, pre-trained transformer neural network features, etc.

In step 310, the method 300 may include training a machine learning model depending on whether weak labeling and/or strong labeling is used. For example, if weak labeling is used to train the machine learning model, the machine learning model may be trained to learn a presence or absence of a set of quality issues in the square tissue tiles and output a label for each square tissue tile. If strong labeling is used to train the machine learning model, the machine learning model may be trained directly as a supervised problem by treating each square tissue tile as an individual instance, rather than treating the square tissue tiles separately.

In step 312, the method 300 may include writing machine learning model information (e.g., weights corresponding to parameters of a machine learning model that produce vectors encoding an image) to the electronic storage for predicting levels-of-quality for the one or more training digital whole slide images. For example, the level-of-quality may indicate a QC issue in a slide.

The below description describes how to use an algorithm with expert labeling, according to the first example embodiment described above. The exemplary method 314 for using a machine learning model may include one or more of the following steps. In step 316, the method 314 may include receiving one or more digital whole slide images of a specific type at an electronic storage, e.g., cloud-based storage, hard disk, RAM, etc.

In step 318, the method 314 may include breaking the one or more digital whole slide images into square tissue tile images. In some embodiments, a subset of tiles may be manually selected for analysis. For faster processing, background tiles of the one or more digital whole slide images may also be removed. Removing the background tiles may be performed using thresholding based on a variance of pixels in a square tissue tile image to identify if the square tissue tile image is foreground, for example, using Otsu's method, comparing tile pixel values to a reference foreground distribution, etc. The AI system may receive a selection of the foreground tiles or background tiles.

In step 320, the method 314 may include extracting one or more vectors of features from one or more foreground tiles of the square tissue tile images. Extraction may be performed using various techniques including, e.g., hand-engineered features (e.g., SIFT, ORB, RIFT, SURF, etc. descriptors), pre-trained CNN embeddings using supervised learning, pre-trained CNN embeddings using weakly-supervised or self-supervised learning techniques, pre-trained transformer neural network features, etc.

In step 322, the method 314 may include running a trained machine learning model on the one or more vectors of features to infer whether one or more quality issues are present in the one or more digital whole slide images. In some embodiments, the method 314 may include predicting a type of quality issue, if present. For example, the AI system may determine, based on output of the trained machine learning model, whether a quality issue is present in the one or more digital whole slide images and may predict if the quality issue includes blur, crushed tissue, etc.

In step 324, the method 314 may include writing a result of running the trained machine learning model to the electronic storage for a task (e.g., detecting cancer, classifying or sub-classifying cancer, detecting other morphological features, predicting response to treatment, determining if a biomarker is present, etc.). For example, the AI system may then write a result of the prediction to the electronic storage. In some embodiments, the method 314 may include producing a visualization of the presence or the absence of each quality issue and outputting an image to the user. Additionally, or alternatively, if the each square tissue tile image has a sufficient amount of quality problems, the method 314 may include flagging a user with a visual indicator indicating whether the digital whole slide image may be used for downstream tasks (e.g., diagnosis by a human expert or used as input to an AI system for diagnosis). The method 314 may also include reporting one or more specific problems with a digital whole slide image to a user (e.g., via a user device), where the problem is present, and providing a recommendation to improve the problem. This reporting may include generating a report, producing a visualization, and/or the like.

System Using Clustering Analysis to Identify Regions of Interest

According to an embodiment of the present disclosure, each digital whole slide image may be divided into smaller tissue tile images. From those tissue tile images, a signature may be extracted that represents a set of visual features. Tissue tile images with similar features may be grouped in clusters that are assigned to be part of the region of interest for a task. Any new tissue tile image that has to be classified may use its signature to find the closest cluster and its label.

The tissue tile images of interest of a given digital whole slide image may then be combined to create a slide signature (slide2vec) that represents the digital whole slide image's composition. This digital whole slide image signature associated with level-of-quality annotations may then be used to train a classification model that may be used to predict the usability of new slides.

Figure 4:
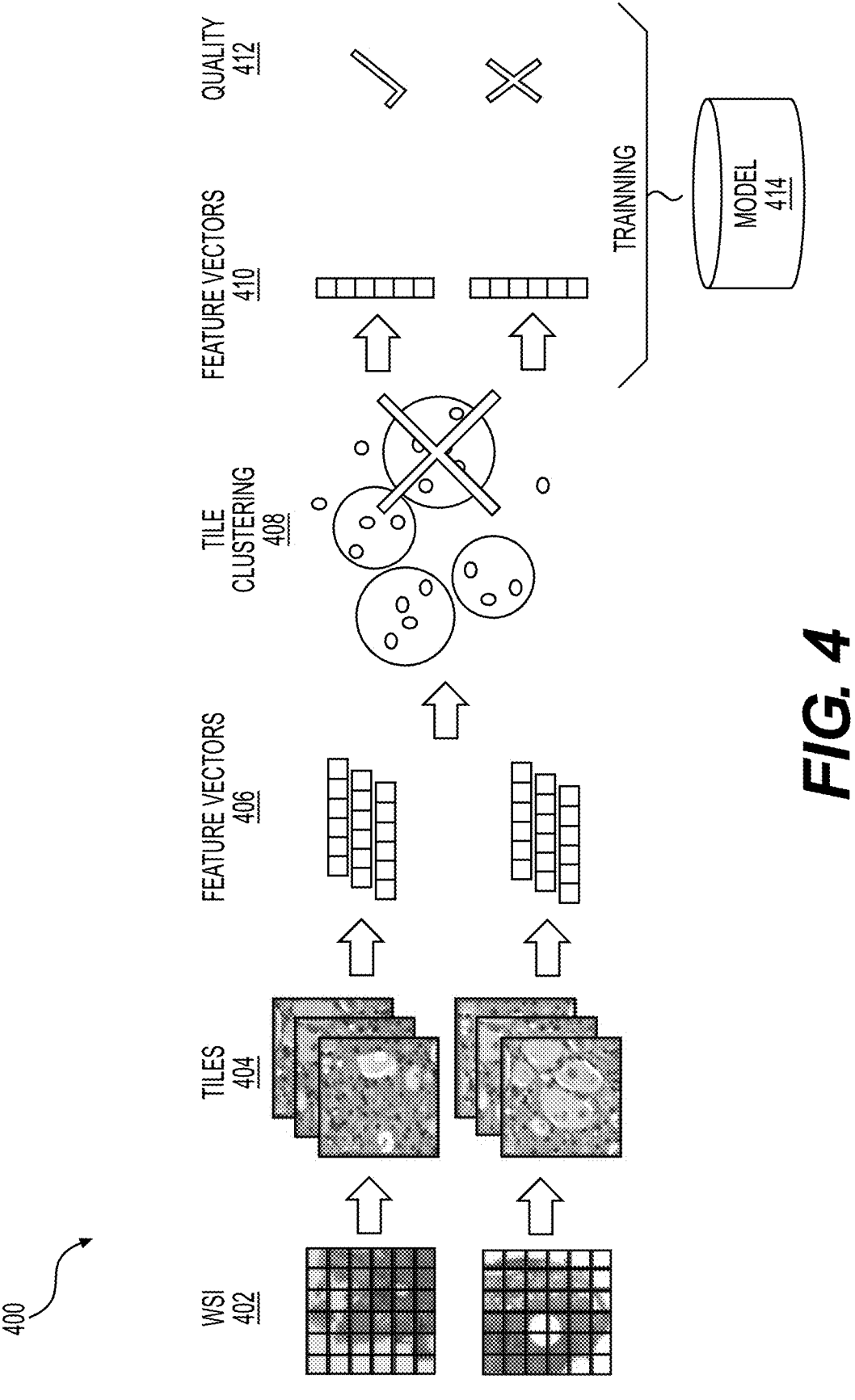
FIG. 4 illustrates an exemplary clustering analysis for a region of interest, according to an exemplary embodiment of the present disclosure.

FIG. 4 illustrates an exemplary clustering analysis for a region of interest, according to an exemplary embodiment of the present disclosure. In particular, FIG. 4 illustrates an example workflow 400 for the clustering analysis. The workflow 400 may include breaking digital whole slide images 402 (WSIs, labeled as "WSI 402" in FIG. 4) into square tissue tile images 404 (labeled "TILES 404" in FIG. 4). For example, the breaking may be performed in a manner similar to that described elsewhere herein, such as at step 504 of FIG. 5A. Feature vectors 406 (labeled "FEATURE VECTORS 406" in FIG. 4) may be extracted from the tiles 404, e.g., in a manner similar to that described elsewhere herein, such as at step 506 of FIG. 5A. Once extracted, the workflow 400 may include a tile clustering step 408 (labeled "TILE CLUSTERING 408" in FIG. 4). The tile clustering 408 may be performed in a manner similar to that described elsewhere herein, such as at step 508 of FIG. 5A. Additional feature vectors 410 (labeled "FEATURE VECTORS 410" in FIG. 4) may be generated and used to train a model 414. The additional feature vectors 410 may be generated in a manner similar to that described elsewhere herein, such as at step 514 of FIG. 5A. The feature vectors may be clustered and may be selected canonical features (e.g., representing a signature described elsewhere herein). In addition, an indication of whether the quality of the digital whole slide images is sufficient or poor, particular quality issues present, and/or the like may be input to the model for training. For example, the indication may be provided in a manner similar to that described elsewhere herein, such as at step 516 of FIG. 5A.

FIG. 5A is a flowchart illustrating an exemplary method 500 for training an algorithm using clustering analysis to identify regions of interest and FIG. 5B is a flowchart of an exemplary method 520 for using an algorithm with clustering analysis to identify regions of interest, according to an exemplary embodiment of the present disclosure. For example, an exemplary method 500 (e.g., steps 502-518) and/or the method 520 (e.g., steps 522-534) may be performed by the slide analysis tool 101 automatically or in response to a request from a user (e.g., physician, pathologist, etc.).

According to one embodiment, the exemplary method 500 for training a machine learning model may include one or more of the following steps. In step 502, the method 500 may include receiving one or more training digital whole slide images of a specific type at an electronic storage, e.g., cloud-based storage, hard disk, RAM, etc.

In step 504, the method 500 may include breaking the one or more training digital whole slide images into square tissue tile images. For faster processing, background tiles of the square tissue tile images may be removed. Removing the background tiles may be performed using thresholding based on a variance of pixels in a square tissue tile image to identify if they are foreground tiles, for example, using Otsu's method, comparing square tissue tile pixel values to a reference foreground distribution, etc. The AI system may receive a selection of the foreground tiles or background tiles.

In step 506, the method 500 may include extracting one or more vectors of features from the square tissue tile images. The extracting may be performed using one or more techniques including, e.g., hand-engineered features (e.g., SIFT, ORB, RIFT, SURF, etc. descriptors), pre-trained CNN embeddings using supervised learning, pre-trained CNN embeddings using weakly-supervised or self-supervised learning techniques, pre-trained transformer neural network features, etc.

In step 508, the method 500 may include running a clustering algorithm on the one or more vectors of features to cluster the square tissue tile images. Clustering the square tissue tile images may be performed using k-means, mean-shift, hierarchical density-based spatial clustering of applications with noise (HDBSCAN), spectral, Birch, etc.

In step 510, the method 500 may include writing clustering information (e.g., centroids, index for similarity search, etc.) to the electronic storage. In some embodiments, the stored information may be used for determining cluster membership of new samples.

In step 512, the method 500 may include annotating one or more clusters identified in the clustering information that constitute a region of interest for a task. In some embodiments, the step 512 may include a user manually annotating the one or more clusters.

In step 514, the method 500 may include, for the task, combining one or more of the square tissue tile images associated with the one or more clusters to create one or more vectors of features for the one or more training digital whole slide images. In some embodiments, the one or more square tissue tile images may be marked as part of a region of interest to create a vector of features for each slide (slide2vec) representing its composition. This may be performed by using one-hot-encoding, counts, term frequency—inverse document frequency (TF-IDF), etc.

In step 516, the method 500 may include, for the one or more training digital whole slide images annotated with levels-of-quality for the task, generating one or more associated vectors of features and training one or more classifiers. This may be performed using machine learning, e.g., gradient boosted trees, support vector machines, multilayer perceptron, transformers, etc.

In step 518, the method 500 may include, for the task, writing machine learning model information (e.g., weights) from the one or more classifiers to the electronic storage. In some embodiments, the stored information may be used for predicting a slide level-of-quality and an AI system may write a result of predicting the slide level-of-quality to the electronic storage.

According to one embodiment, the exemplary method 520 for using a machine learning model may include one or more of the following steps. In step 522, the method 520 may include receiving one or more digital whole slide images of a specific type at an electronic storage, e.g., cloud-based storage, hard disk, RAM, etc.

In step 524, the method 520 may include breaking the one or more digital whole slide images into square tissue tile images. In some embodiments, a subset of the tiles may be manually selected for analysis. For faster processing, background tiles may be removed from the square tissue tile images. Removing background tiles may be performed using thresholding based on a variance of pixels in a square tissue tile image to identify if the square tissue tile image is foreground, using Otsu's method, comparing square tissue tile image pixel values to a reference foreground distribution, etc. The AI system may receive a selection of the foreground or background tiles.

In step 526, the method 500 may include extracting one or more vectors of features from one or more foreground tiles of the square tissue tile images. The extracting may be performed using a range of techniques, including hand-engineered features (e.g., SIFT, ORB, RIFT, SURF, etc. descriptors), pre-trained CNN embeddings using supervised learning, pre-trained CNN embeddings using weakly-supervised or self-supervised learning techniques, pre-trained transformer neural network features, etc.

In step 528, the method 520 may include reading clustering information written during training (e.g., during the method 500) and determining cluster membership for the square tissue tile images of the one or more digital whole slide images. In step 530, the method 520 may include, for a set of tasks with associated clusters annotated as including a region of interest, combining the one or more vectors of features to generate one or more vectors of features (slide2vec) for the set of tasks. In some embodiments, this may be performed using the same technique used in the training phase in the method 500.

In step 532, the method 520 may include reading machine learning model information written during training and predicting a level-of-quality for the set of tasks using the one or more vectors of features. The method 520 may, in some embodiments, estimate an uncertainty, a level of confidence, etc. for the prediction or may include metrics (e.g., a score with a confidence level) for the prediction. In step 534, the method 520 may include writing a result of the prediction for the set of tasks to the electronic storage.

Example Embodiment: Scanner with Quality Control Platform 100

Figure 6:
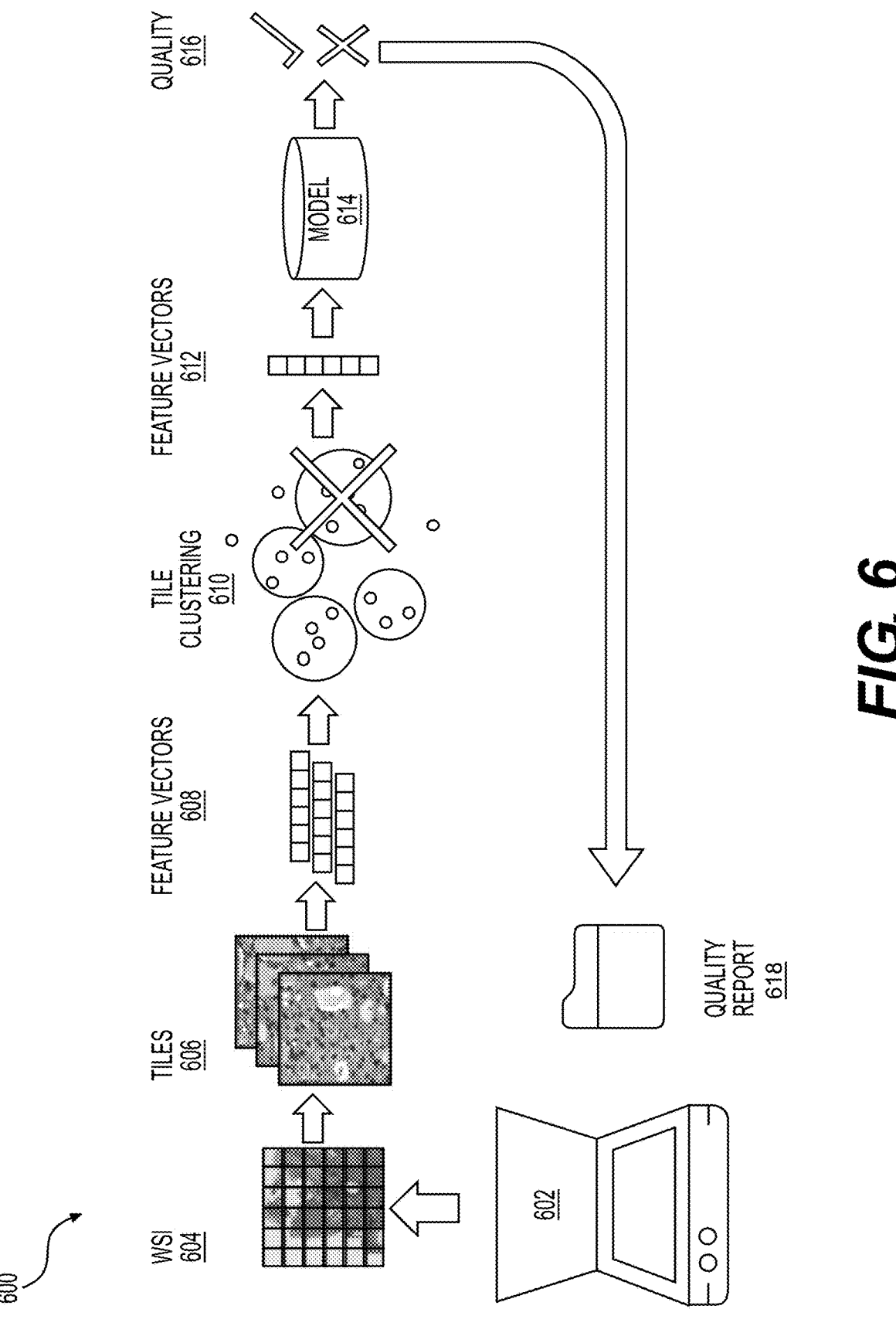
FIG. 6 illustrates an exemplary workflow of a scanner with a quality control platform, according to an exemplary embodiment of the present disclosure.

During the digitalization process, slide scanning operators may use certain embodiments as part of their production workflow to evaluate the quality of a digital slide and correct any issues that might be present. This may allow slide scanning operators to more quickly determine the correct course of action, e.g., re-scanning the slide, re-cutting the tissue block, etc. FIG. 6 illustrates an example of using a scanner with a quality control platform 100.

FIG. 6 illustrates an exemplary workflow 600 of a scanner with a quality control platform 100. The exemplary workflow 600 may begin at a slide scanner 602, where tissue specimens may be scanned into the quality control platform 100. The slide scanner 602 may output a digital whole slide images (WSI) 604, which may then be broken into a collection of tissue tile images 606, as described elsewhere herein. One or more tile feature vectors 608 may be extracted from the tiles 606, as described elsewhere herein. The feature vectors 608 may be clustered into clusters 610 and cluster membership may be determined, as described elsewhere herein. Any clusters determined to not be members of the cluster associated with a task may be removed from the workflow 600. For a task and set of associated clusters 610, the tile feature vectors 608 may be combined to generate one or more additional feature vectors 612. The parameters of the additional feature vectors 612 may be processed by a trained model 614 to be used in quality control for uploaded slides. An indication 616 of the quality of the slide may be output from the model (e.g., in a quality report 618, displayed to a user, etc.). The report may include a visualization, a document, and/or the like.

Example Embodiment: Digital Viewer with Quality Control System

When a digitized slide is used by a pathologist to make a diagnosis, the digitized slide may be evaluated by the quality control platform 100, as described elsewhere herein. If the digitized slide has quality issues, the viewing application tool 108 may show this information in association with the slide name in the viewing application tool's slide catalog, or next to the slide when the slide is viewed. In some embodiments, if the slide contains tiles with quality issues, those tiles may be highlighted in different colors based on the quality issue. A legend that maps color to issue may be presented next to the slide by the viewing application tool 108. In some embodiments, the slide may be marked as either ready or not ready for primary diagnosis to a pathologist by the viewing application tool 108. The mark may appear next to the slide name in the slide's catalog in the viewing application tool 108 or next to the slide when it is opened, for example.

Figure 7:
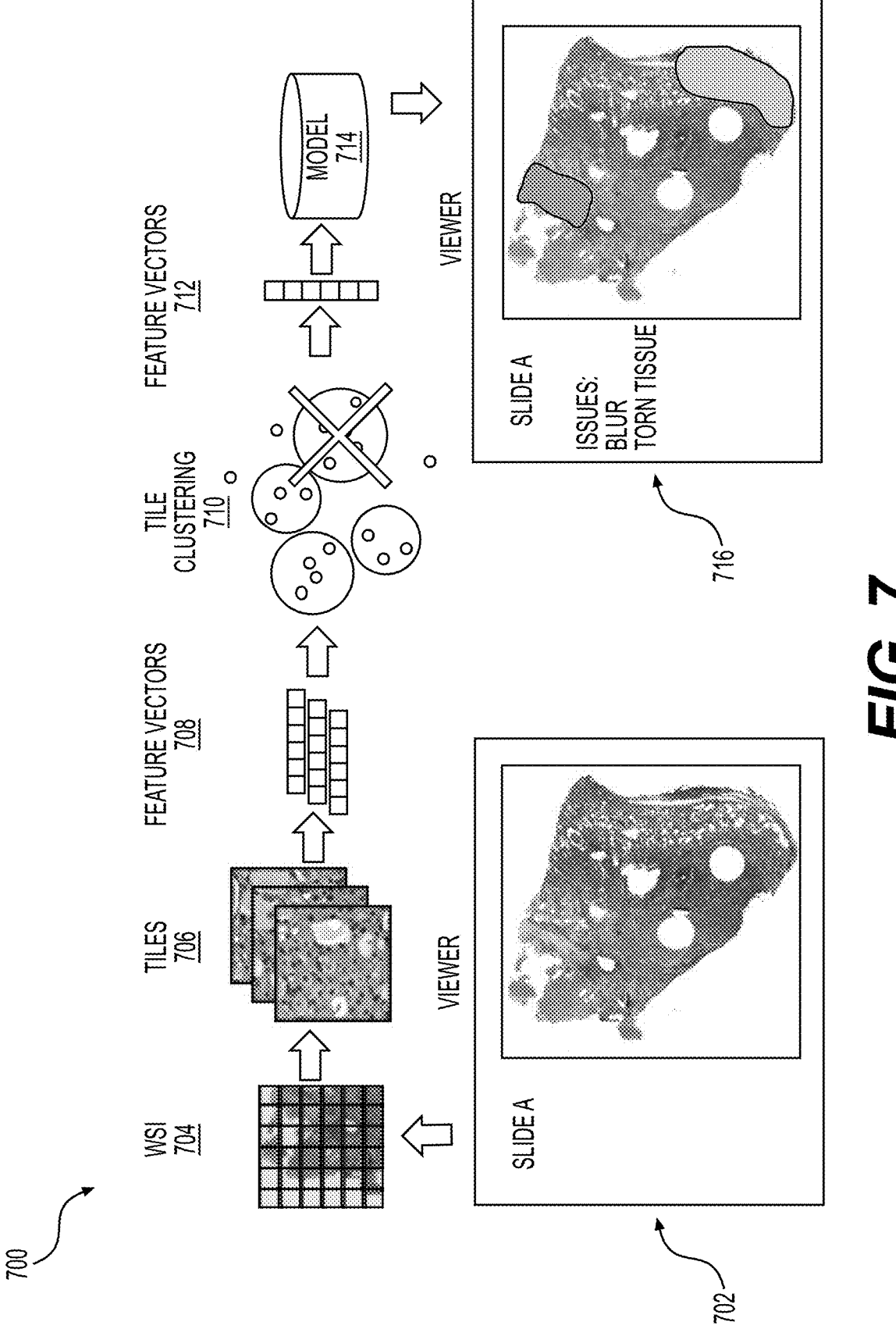
FIG. 7 illustrates an exemplary workflow of a digital viewer of a quality control platform, according to an exemplary embodiment of the present disclosure.

FIG. 7 illustrates an exemplary workflow 700 of a digital viewer (e.g., the viewing application tool 108) of a quality control platform 100. Workflow 700 may include a slide 702 displayed on the digital viewer. The slide 702 may be as a WSI 704, which may be broken into a collection of tiles 706 by the quality control platform 100, as described elsewhere herein. A number of tile feature vectors 708 may be extracted from the collection of tiles 706, as described elsewhere herein. The tile feature vectors 708 may be clustered through tile clustering 710 and cluster membership may be determined, as described elsewhere herein. Any clusters determined to not be members of the cluster associated with a given task may be deleted from the workflow 700. For a task and set of associated clusters, one or more additional feature vectors 712 may be formed. The parameters of the feature vectors 712 may be processed by a trained model 714 to determine quality control issues in the feature vectors 712. For example, the trained model 714 may output a highlighted slide 716 (e.g., by displaying the highlighted slide via the viewing application tool 108) that indicates where possible quality issues exist.

Example Embodiment: Slide Repository with Quality Control Platform

When a digitized slide is added to a digital slide repository of a lab (e.g., by a lab technician for future use in primary diagnosis, storage, preservation, or other use), the slide may be evaluated by the quality control platform 100. If the slide has quality issues, the quality control platform 100 may log the issues in the repository and may associate this information with the slide. In some embodiments, the quality control platform 100 may also log use cases in the pathology workflow that the slide is suitable for, e.g., primary diagnosis by a human, primary diagnosis with an AI system, digital biomarker screening, etc. In some embodiments, the slide may be flagged using integrated notification systems to appropriate personnel based on the type of quality issue, suggesting further actions that may be related to the slide, etc.

Figure 8:
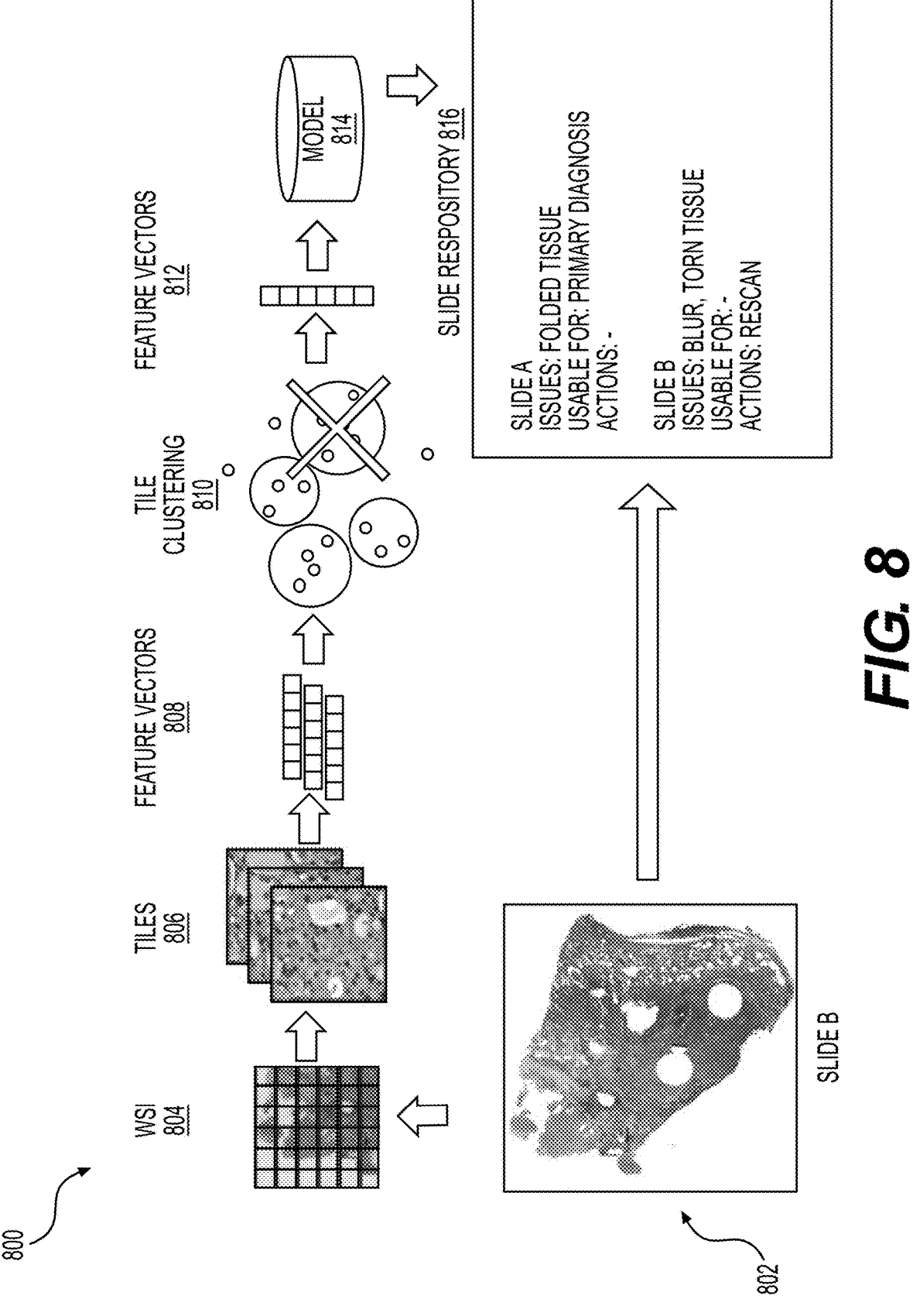
FIG. 8 illustrates an exemplary slide repository with a quality control platform, according to an exemplary embodiment of the present disclosure.

FIG. 8 illustrates an exemplary workflow 800 for a slide repository with a quality control platform 100, according to an exemplary embodiment of the present disclosure. The workflow 800 may include a slide 802 displayed on a digital viewer (e.g., the viewing application tool 108). The slide 802 may be a WSI 804, which may be broken into a collection of tiles 806, as described elsewhere herein. A number of tile feature vectors 808 may be extracted from the collection of tiles 806, as described elsewhere herein. The tile feature vectors 808 may be clustered using tile clustering 810 and cluster membership may be determined, as described elsewhere herein. Any clusters determined to not be members of the cluster associated with a task may be deleted from the workflow 800. For a task and set of associated clusters, additional feature vectors 812 may be generated. The feature vectors 812 may be input to a trained model 814 to be used in quality control for uploaded slides. Information related to issues in the slide, usability of the slide, and/or actions that may be taken to address the quality issue may be stored in a slide repository 816.

Figure 9:
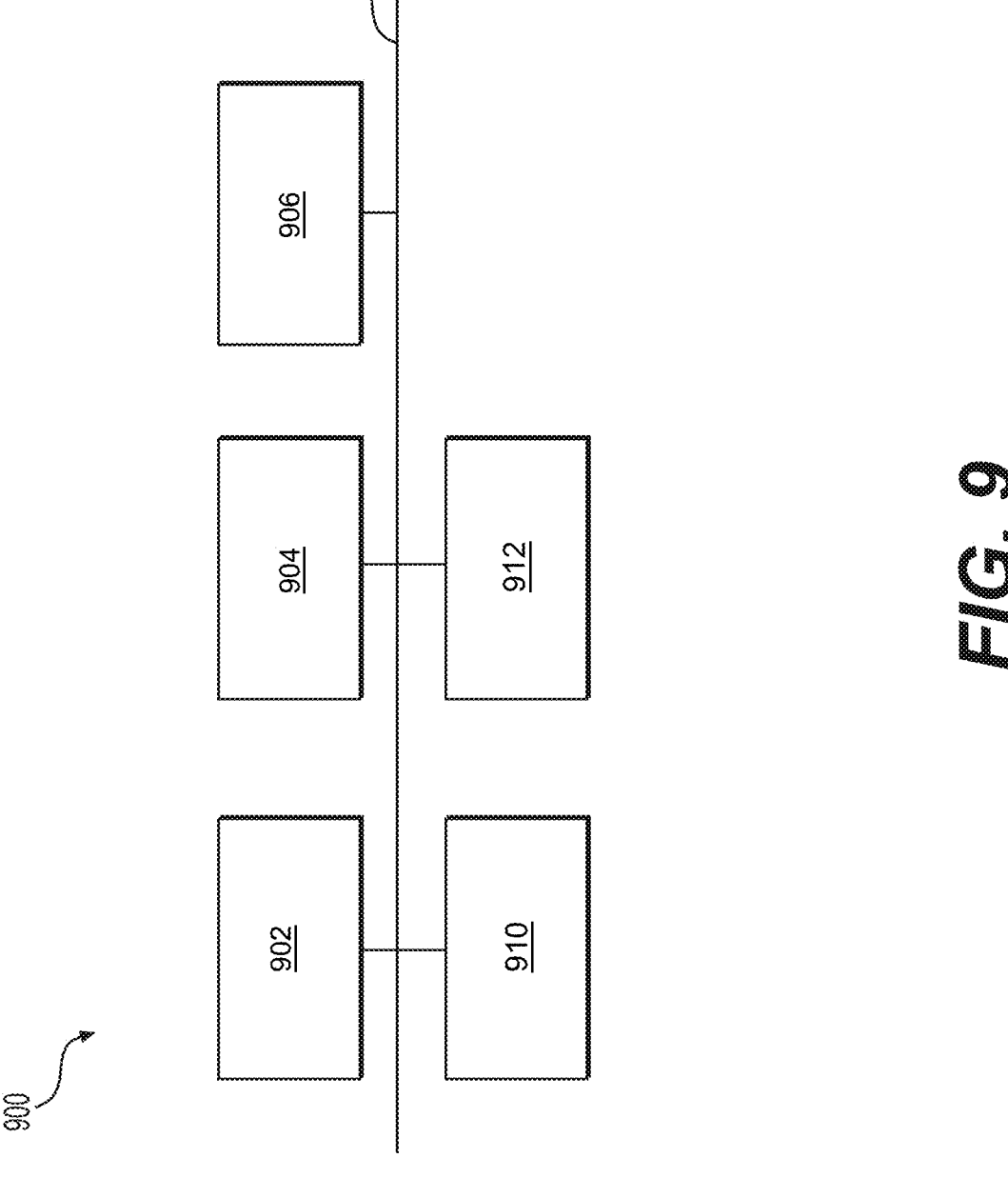
FIG. 9 depicts an example computing device, according to certain embodiments of the present disclosure.

FIG. 9 illustrates an example computing device 900, according to certain embodiments of the present disclosure. In particular, FIG. 9 is a simplified functional block diagram of a computing device 900 that may be configured as a device for executing the methods or workflows of FIGS. 2-8. For example, the computing device 900 may be configured as the quality control platform 100 (or tools thereof illustrated in FIG. 1B), the slide analysis tool 101 (or platforms or modules thereof illustrated in FIG. 1C), the server systems 110, the physician servers 121, the hospital servers 122, the clinical trial servers 123, the research lab servers 124, the laboratory information systems 125, and/or another device or system according to certain embodiments described herein. In various embodiments, any of the devices or systems described herein may be the computing device 900 illustrated in FIG. 9 and/or may include one or more of the computing devices 900.

As illustrated in FIG. 9, the computing device 900 may include a processor 902, a memory 904, an output component 906, a communication bus 908, an input component 910, and a communication interface 912. The processor 902 may include a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some embodiments, the processor 902 includes one or more processors capable of being programmed to perform a function. The memory 904 may include a random access memory (RAM), a read only memory (ROM), and/or another type of dynamic or static storage device (e.g., a flash memory, a magnetic memory, and/or an optical memory) that stores information and/or instructions for use by the processor 902.

The output component 906 may include a component that provides output information from the computing device 900 (e.g., a display, a speaker, and/or one or more light-emitting diodes (LEDs)). The communication bus 908 may include a component that permits communication among the components of the computing device 900. The input component 910 may include a component that permits the computing device 900 to receive information, such as via user input (e.g., a touch screen display, a keyboard, a keypad, a mouse, a button, a switch, and/or a microphone). Additionally, or alternatively, the input component 910 may include a sensor for sensing information (e.g., a global positioning system (GPS) component, an accelerometer, a gyroscope, and/or an actuator). The communication interface 912 may include a transceiver-like component (e.g., a transceiver and/or a separate receiver and transmitter) that enables the computing device 900 to communicate with other devices, such as via a wired connection, a wireless connection, or a combination of wired and wireless connections. The communication interface 912 may permit the computing device 900 to receive information from another device and/or provide information to another device. For example, the communication interface 912 may include an Ethernet interface, an optical interface, a coaxial interface, an infrared interface, a radio frequency (RF) interface, a universal serial bus (USB)

interface, a wireless local area network interface, a cellular network interface, and/or the like.

As noted above, the computing device 900 illustrated in FIG. 9 may perform one or more processes described herein. The computing device 900 may perform these processes based on the processor 902 executing software instructions stored by a non-transitory computer-readable medium, such as the memory 904 and/or another storage component. For example, the storage component may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. A computer-readable medium is defined herein as a non-transitory memory device. A memory device includes memory space within a single physical storage device or memory space spread across multiple physical storage devices.

Software instructions may be read into the memory 904 and/or a storage component from another computer-readable medium or from another device via the communication interface 912. When executed, software instructions stored in the memory 904 and/or the storage component may cause the processor 902 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software.

Throughout this disclosure, references to components or modules generally refer to items that logically may be grouped together to perform a function or group of related functions. Like reference numerals are generally intended to refer to the same or similar components. Components and/or modules may be implemented in software, hardware, or a combination of software and/or hardware.

The tools, modules, and/or functions described above may be performed by one or more processors. "Storage" type media may include any or all of the tangible memory of the computers, processors or the like, or associated modules thereof, such as various semiconductor memories, tape drives, disk drives and the like, which may provide non-transitory storage at any time for software programming.

Software may be communicated through the Internet, a cloud service provider, or other telecommunication networks. For example, communications may enable loading software from one computer or processor into another. As used herein, unless restricted to non-transitory, tangible "storage" media, terms such as computer or machine "readable medium" refer to any medium that participates in providing instructions to a processor for execution.

The foregoing general description is exemplary and explanatory only, and not restrictive of the disclosure. Other embodiments of the invention may be apparent to those skilled in the art from consideration of the specification and practice of the invention disclosed herein. It is intended that the specification and examples be considered as exemplary only.

What is claimed is:

1. A computer-implemented method for processing one or more digital whole slide images (WSIs), the method comprising:

receiving, by a trained artificial intelligence (AI) system at an electronic storage of the AI system, one or more digital WSIs associated with a tissue specimen;

breaking, by the trained AI system, the one or more digital WSIs into a plurality of tile images;

determining, by the trained AI system, one or more foreground tiles of the plurality of tile images;

extracting, by the trained AI system, a plurality of tile feature vectors for the one or more foreground tiles;

clustering, by the trained AI system, the plurality of tile feature vectors into one or more clusters;

determining, by the trained AI system, cluster membership for the one or more clusters based on clustering information determined during training of the AI system;

combining, by the trained AI system, tile feature vectors in associated clusters sharing cluster membership to generate one or more vectors of features representing a slide signature; and generating, using the trained AI system, an inference of one or more quality issues present in the one or more digital WSIs based on the one or more vectors of features representing the slide signature.

2. The computer-implemented method of claim 1, wherein determining the one or more foreground tiles comprises receiving a selection of the one or more foreground tiles.

3. The computer-implemented method of claim 1, further comprising:

removing one or more background tiles from the plurality of tile images prior to extracting the plurality of tile feature vectors from the one or more foreground tiles.

4. The computer-implemented method of claim 1, further comprising:

determining, based on the inference of the trained AI system, whether one or more quality issues are present in the one or more digital WSIs; and predicting a type of the one or more quality issues after determining that the one or more quality issues are present.

5. The computer-implemented method of claim 1, further comprising:

determining, based on the inference of the trained AI system, whether one or more quality issues are present in the one or more digital WSIs; and producing a visualization of a result of determining whether the one or more quality issues are present.

6. A computer system for processing one or more digital whole slide images (WSIs), the computer system comprising:

at least one memory storing instructions; and at least one processor configured to execute the instructions to perform operations comprising:

receiving, by a trained artificial intelligence (AI) system at an electronic storage of the AI system, one or more digital WSIs associated with a tissue specimen;

breaking, by the trained AI system, the one or more digital WSIs into a plurality of tile images;

determining, by the trained AI system, one or more foreground tiles of the plurality of tile images;

extracting, by the trained AI system, a plurality of tile feature vectors for the one or more foreground tiles;

clustering, by the trained AI system, the plurality of tile feature vectors into one or more clusters;

determining, by the trained AI system, cluster membership for the one or more clusters based on clustering information determined during training of the AI system;

combining, by the trained AI system, tile feature vectors in associated clusters sharing cluster membership to generate one or more vectors of features representing a slide signature; and generating, using the trained AI system, an inference of one or more quality issues present in the one or more digital WSIs based on the one or more vectors of features representing the slide signature.

7. The computer system of claim 6, wherein determining the one or more foreground tiles comprises receiving a selection of the one or more foreground tiles prior to extracting the one or more vectors of features from the one or more foreground tiles.

8. The computer system of claim 6, wherein the operations further comprise:

removing one or more background tiles from the plurality of tile images prior to extracting the plurality of tile feature vectors from the one or more foreground tiles.

9. The computer system of claim 6, wherein the operations further comprise:

determining, based on the inference of the trained AI system, whether one or more quality issues are present in the one or more digital WSIs; and predicting a type of the one or more quality issues after determining that the one or more quality issues are present.

10. The computer system of claim 6, wherein the operations further comprise:

determining, based on the inference of the trained AI system, whether one or more quality issues are present in the one or more digital WSIs; and producing a visualization of a result of determining whether the one or more quality issues are present.

11. A non-transitory computer-readable medium storing instructions that, when executed by a processor, cause the processor to perform operations for processing one or more digital whole slide images (WSIs), the operations comprising:

receiving, by a trained artificial intelligence (AI) system at an electronic storage of the AI system, one or more digital WSIs associated with a tissue specimen;

breaking, by the trained AI system, the one or more digital WSIs into a plurality of tile images;

determining, by the trained AI system, one or more foreground tiles of the plurality of tile images;

extracting, by the trained AI system, a plurality of tile feature vectors for the one or more foreground tiles;

clustering, by the trained AI system, the plurality of tile feature vectors into one or more clusters;

determining, by the trained AI system, cluster membership for the one or more clusters based on clustering information determined during training of the AI system;

combining, by the trained AI system, tile feature vectors in associated clusters sharing cluster membership to generate one or more vectors of features representing a slide signature; and generating, using the trained AI system, an inference of one or more quality issues present in the one or more digital WSIs based on the one or more vectors of features representing the slide signature.

12. The non-transitory computer-readable medium of claim 11, wherein determining the one or more foreground tiles comprises receiving a selection of the one or more foreground tiles prior to extracting the one or more vectors of features from the one or more foreground tiles.

13. The non-transitory computer-readable medium of claim 11, wherein the operations further comprise:

removing one or more background tiles from the plurality of tile images prior to extracting the plurality of tile feature vectors from the one or more foreground tiles.

14. The non-transitory computer-readable medium of claim 11, wherein the operations further comprise:

determining, based on the inference of the trained AI system, whether one or more quality issues are present in the one or more digital WSIs; and predicting a type of the one or more quality issues after determining that the one or more quality issues are present.

15. The non-transitory computer-readable medium of claim 11, wherein the operations further comprise:

determining, based on the inference of the trained AI system, whether one or more quality issues are present in the one or more digital WSIs; and producing a visualization of a result of determining whether the one or more quality issues are present.

16. The computer-implemented method of claim 1, further comprising:

determining, based on the inference of the trained AI system, whether one or more quality issues are present in the one or more digital WSIs; and generating and outputting a report indicating a result of determining whether the one or more quality issues are present.

17. The computer system of claim 6, wherein the operations further comprise:

determining, based on the inference of the trained AI system, whether one or more quality issues are present in the one or more digital WSIs; and generating and outputting a report indicating a result of determining whether the one or more quality issues are present.

18. The non-transitory computer-readable medium of claim 11, wherein the operations further comprise:

determining, based on the inference of the trained AI system, whether one or more quality issues are present in the one or more digital WSIs; and generating and outputting a report indicating a result of determining whether the one or more quality issues are present.

19. The computer-implemented method of claim 1, further comprising:

determining, based on the inference of the trained AI system, whether one or more quality issues are present in the one or more digital WSIs; and storing, by the trained AI system to the electronic storage, a result of determining whether the one or more quality issues are present.

20. The computer system of claim 6, wherein the operations further comprise:

determining, based on the inference of the trained AI system, whether one or more quality issues are present in the one or more digital WSIs; and storing, by the trained AI system to the electronic storage, a result of determining whether the one or more quality issues are present.

* * * * *